Patented Oct. 8, 1929

1,730,699

UNITED STATES PATENT OFFICE

HERMANN WAGNER, OF SODEN-ON-THE-TAUNUS, RUDOLF BRUNE, OF HOCHST-ON-THE-MAIN, MAX HESSENLAND, OF KOENIGSBERG, AND ERWIN HOFFA, FRITZ MÜLLER, AND HANS HEYNA, OF HOCHST-ON-THE-MAIN, GERMANY, ASSIGNORS TO GENERAL ANILINE WORKS, INC., OF NEW YORK, N. Y., A CORPORATION OF DELAWARE

VAT DYE AND PROCESS OF PRODUCING THE SAME

No Drawing. Application filed May 3, 1926, Serial No. 106,492, and in Germany May 6, 1925.

The present invention relates to the new vat dyestuffs of the general formula:

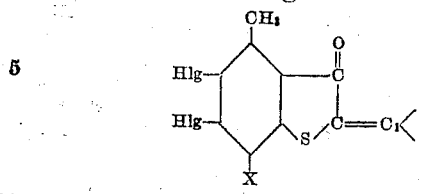

wherein $C_1$ represents a carbon atom belonging to the five-membered nucleus of an isatin compound and X represents hydrogen which may be replaced by halogen.

These dyestuffs are obtainable, for instance, by condensing 4-methyl-5.6-dihalogen-hydroxy-thionaphthene with an isatin compound and halogenating the reaction product if desired.

It is obvious that instead of 4-methyl-5.6-dihalogen-hydroxy-thionaphthene one may use in this process suitable derivatives thereof.

The manufacture of the 4-methyl-5.6-dihalogen-hydroxy-thionaphthene is described in U. S. P. 1,610,539.

Instead of using as starting material a 4-methyl-5.6-dihalogenhydroxythionaphthene, there may also be used as such a 3-methyl-4.5-dihalogen-1-thioglycollic-2-carboxylic acid, provided that the latter is transformed by the existing conditions of the reaction into the corresponding hydroxythionaphthene or a reactive derivative thereof.

The properties of the dyestuffs obtainable by the present process may be considerably improved by further halogenating them in the usual manner. The color of the dyestuffs is thereby not only changed to the desired blue tint, but their fastness to kier-boiling is also enhanced.

The following examples illustrate our invention, the parts being by weight.

1. 24 parts of 4-methyl-5.6-dichloro-3-hydroxythionaphthene are dissolved in alcohol and an alkali and mixed with an alcoholic solution of 25 parts of 4-nitrosodimethylaniline. After having stirred the mass for a short time, the 4-methyl-5.6-dichloro-2-3-dihydro-3-ketothionaphthene-2-(4'-dimethylamino)-anil separates completely. It is filtered by suction and boiled for several hours together with 28 parts of 4-bromo-3.2-(3'-hydroxy-1'-thiophene). naphthalene:

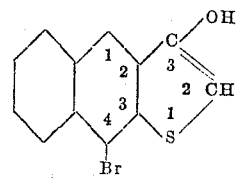

and 400 parts of glacial acetic acid. After cooling, the resulting mass is filtered off by suction and washed.

The dyestuff thus obtained dissolves in nitro benzene to a bluish-red solution with a violet fluorescence and yields a yellowish-red vat dyeing cotton violet tints of particularly good properties as to fastness. It has the probable formula:

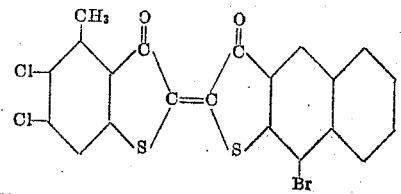

2. To a solution of the dichlorisatin-α-chloride (obtained from 65 parts of 5.7-dichlorisatin, 120 parts of benzene and 65 parts of phosphorous pentachloride) is added a suspension of 70 parts of 4-methyl-5.6-dichloro-3-hydroxy-1-thionaphthene in 70 parts of benzene. After having heated the mixture for a short time, the condensation-process is terminated. The reaction takes place according to the equation:

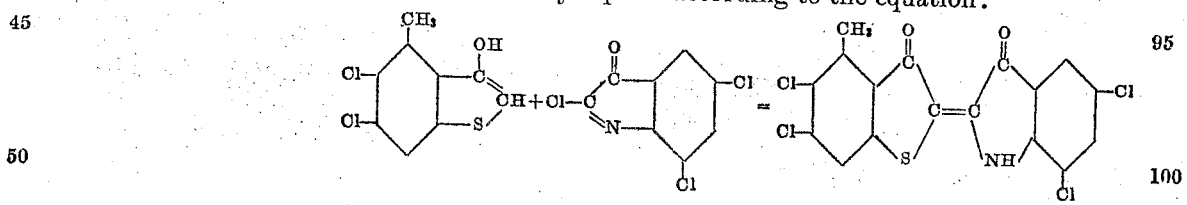

The dyestuff, when filtered and washed out with benzene, forms a reddish-violet powder; it dyes cotton a violet tint of excellent fastness.

3. To a solution of dibromisatin-α-chloride (obtained from 91 parts of 5.7-dibromisatin, 200 parts of benzene and 65 parts of phosphorous pentachloride) is added a suspension of 70 parts of 4-methyl-5.6-dichloro-3-hydroxy-1-thionaphthene in 70 parts of benzene and the whole is heated for a short time to boiling. The dyestuff, when filtered and washed out with benzene, dyes cotton violet tints of excellent fastness. It has the probable formula:

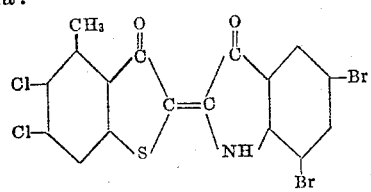

4. To a solution of bromisatine-α-chloride (obtained from 68 parts of 5 bromisatin, 200 parts of benzene and 65 parts of phosphorous pentachloride) is added a suspension of 70 parts of 4-methyl-5.6-dichloro-3-hydroxy-1-thionaphthene in 140 parts of benzene and this mixture is heated for a short time to boiling. The dyestuff, when filtered and washed out with benzene, dyes cotton a violet tint of good properties as to fastness. It has the probable formula:

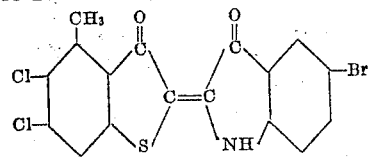

5. To a solution of 59 parts of β-naphthisatin-α-chloride 200 parts of benzene, and 67 parts of phosphorous pentachloride is added a suspension of 70 parts of 4-methyl-5.6-dichloro-3-hydroxy-1-thionaphthene in 140 parts of benzene and the mixture is heated to boiling. The dyestuff, when filtered and washed out with benzene, forms a blue powder. It dyes cotton bright blue tints. It has the probable formula:

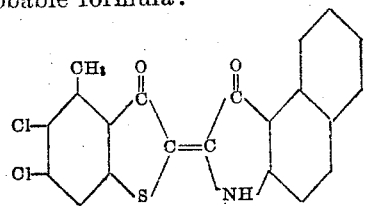

6. 70 parts of 4-methyl-5.6-dichlor-3-hydroxy-1-thionaphthene, 65 parts of dichlorisatin and 1000 parts of glacial acetic acid are heated to boiling. The reaction takes place according to the equation:

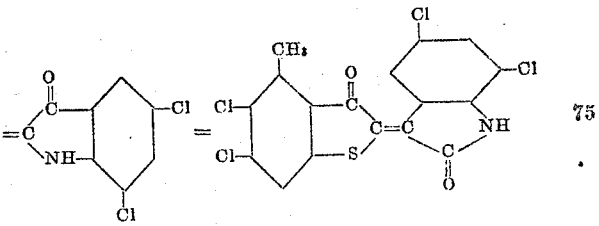

As soon as the condensation is complete, the mass is allowed to cool and filtered off by suction and the resulting dyestuff washed until it shows a neutral reaction. It dyes cotton brown tints.

7. 43 parts of 4-methyl-5.6-dichlorthionapthene-2.2′ 5′7′-(dichlor-) indolindigo are dissolved, while cooling well, in 90 parts of chlorosulfonic acid and gradually mixed with with 22 parts of bromine. The mixture is then stirred for half an hour in the cold and poured on 500 parts of ice to which some bisulfite solution has been added. The dyestuff, when filtered and washed until neutral, dyes cotton violet tints of excellent fastness which have a bluer hue than the non-brominated dyestuff. It has the probable formula:

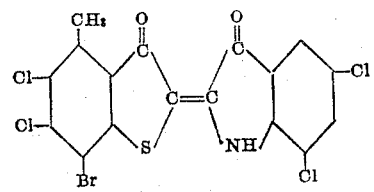

Instead of the components used in the foregoing examples for the condensation with 4-methyl-5.6-dihalogen-3-hydroxythionaphthene, there may also be employed for the said purpose other diketones or derivatives thereof.

We claim:

1. As new products the vat dyestuffs of the general formula:

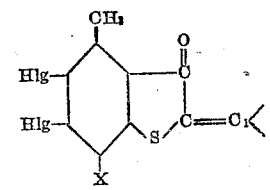

wherein $C_1$ represents a carbon atom belonging to the five-membered nucleus of an isatin compound and X represents hydrogen which may be replaced by halogen.

2. As new products the vat dyestuffs of the general formula:

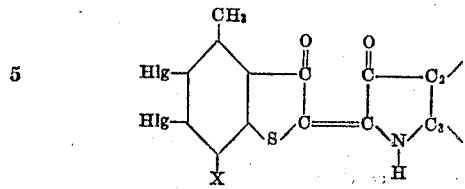

wherein $C_2$ and $C_3$ represent carbon atoms belonging to an aromatic nucleus and X represents hydrogen which may be replaced by halogen.

3. As new products the vat dyestuffs of the general formula:

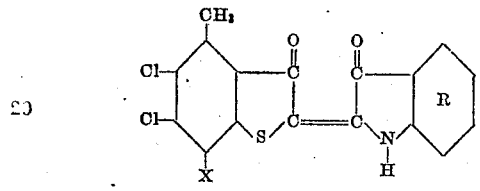

wherein the benzene nucleus R may be substituted by halogen and X represents hydrogen which may be replaced by halogen.

In testimony whereof, we affix our signatures.

HERMANN WAGNER.
RUDOLF BRUNE.
MAX HESSENLAND.
ERWIN HOFFA.
FRITZ MULLER.
HANS HEYNA.